Figure 1:
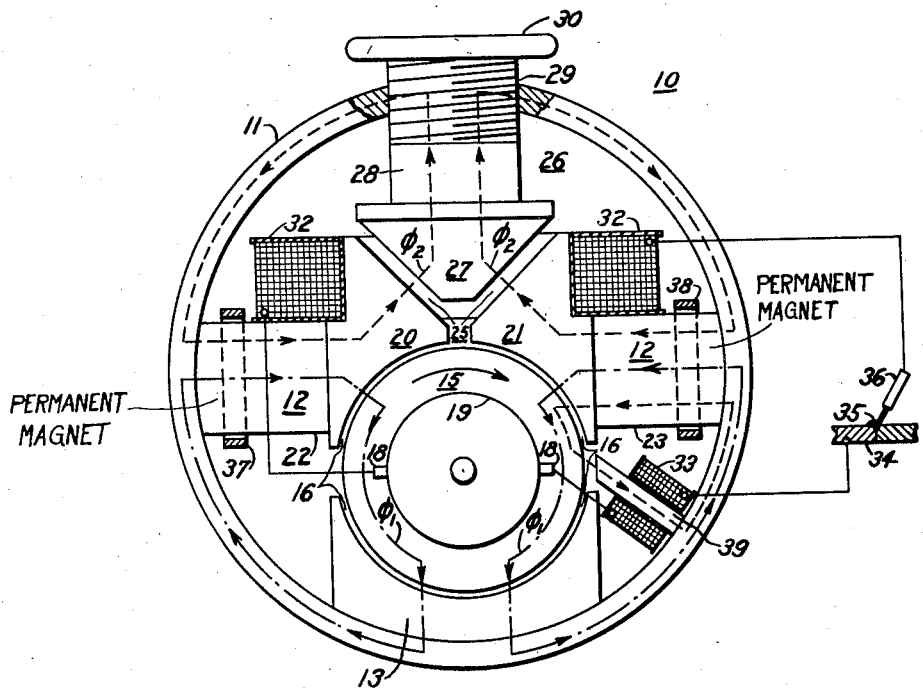

Aug. 23, 1938.   A. GRABNER   2,128,044

DYNAMO ELECTRIC MACHINE

Filed Aug. 31, 1936

WITNESSES:
Wm. B. Sellers.
Nw. C. Groove

INVENTOR
Alfred Grabner
BY
ATTORNEY

Patented Aug. 23, 1938

2,128,044

UNITED STATES PATENT OFFICE 2,128,044

DYNAMO-ELECTRIC MACHINE

Alfred Grabner, Vienna, Austria, assignor to Westinghouse Electric & Manufacturing Company, East Pittsburgh, Pa., a corporation of Pennsylvania Application August 31, 1936, Serial No. 98,749
In Austria October 26, 1935

16 Claims. (Cl. 171—227)

My invention refers generally to dynamo-electric machines and it has reference in particular to a dynamo-electric machine of the type used in electric arc welding.

The steady growth in the use of electric arc welding has created a demand for an improved type of dynamo-electric machine for welding purposes, having characteristics that will facilitate both the ease of welding and the production of quality welds. Research has proven that one of the greatest aids in producing clean, sound, welds is a machine having essentially stable current characteristics. That is, for a given setting of the machine, the current should not vary greatly on momentary short circuits such as might be occasioned by the passing of a globule of molten metal from the rod to the work, or by a momentary touching of the rod to the surface of the molten pool of the arc. Any tendency for the current to surge under such conditions results either in a splattering of the molten metal or "freezing" of the electrode—not only making the arc difficult to maintain but giving an unsound weld.

In an attempt to produce a dynamo-electric machine having suitable welding characteristics, many complicated designs have heretofore been employed. Amongst these the differentially compounded machine and the separately excited machine using a transformer type of reactor have been popular. Such constructions, while giving improved welding performance, have been not only bulky but expensive to build. Because of the additional moving parts and extra iron and copper, the losses have been higher, with resultant lower efficiencies. In addition, the transformer reaction between the series and shunt field windings has resulted in a delayed series field effect, which, under rapidly fluctuating load conditions, as commonly met with in welding, is not at all conducive to a stable arc.

Applications in dynamo-electric machines of some of the recently developed high intensity permanent magnet steels have been made and have proven successful under conditions such as met with in polyphase machines, where (under normal loading) the field amplitudes are more or less constant. In applications on arc welding machines where the rapidly fluctuating load causes wide variations in field intensity, the results have not been so favorable. The wide range of variation in rapidly changing field flux has resulted in a gradual loss of residual magnetism in the permanent magnet members with a corresponding decrease in the output of the machine.

It is, therefore, an object of my invention to provide a dynamo-electric machine in which the excitation flux is produced by a permanent magnet pole and its effectiveness under load conditions is controlled by a field flux dependent upon the loads.

Another object of my invention is to provide for controlling the armature potential of a dynamo-electric machine having an excitation magnetomotive force independent of the load, by reducing the effectiveness of the load independent excitation magnetomotive force through the use of series field means, without reducing the amount of load independent magnetomotive force.

Still another object of my invention is to provide for controlling the output characteristics of a dynamo-electric machine having a permanent magnet source of excitation flux by a series field means.

A further object of my invention is to provide for regulating (over a wide range of welding values,) the output of a dynamo-electric machine in which the excitation flux is produced by a permanent magnet.

A still further object of my invention is to provide for controlling the regulation of a dynamo-electric machine having a permanent magnet pole member by means of a regulating air gap which lies outside the main flux path continually enclosed by the residual flux of the permanent magnet pole member.

Still another object of my invention is to provide for effecting the regulation of a dynamo-electric machine through the diversion of an excitation flux, produced by a permanent magnet pole member, from its no-load air gap path by a load dependent series field flux, without reducing the residual amount of such excitation flux.

Other objects will in part be obvious, and in part appear hereafter.

My invention, accordingly, is disclosed in the embodiment hereof shown in the accompanying drawing, and comprises the features of construction, combination of elements, and arrangement of parts which will be exemplified in the construction hereinafter set forth, and the application, the scope of which will be indicated in the appended claims.

In practicing my invention in its most elementary form, the dynamo-electric machine is provided with a permanent magnet field pole which produces an excitation magnetomotive force the amount or quantity of which is independent of the load. In addition to this, the machine is provided with an additional field coil which is energized in accordance with the load or armature current. The flux thus produced is dependent upon the load of the machine. This load-dependent flux is used to vary the effectiveness, but not the strength of the load-independent excitation magnetomotive force in order to control the voltage characteristic of the machine under load conditions. In other words, the machine may be given a drooping voltage characteristic by properly controlling the permanent magnet flux with the load dependent flux.

The magnitude of the load current is controlled by varying the relationship of the two fluxes in any suitable and well known manner. In this instance, it is done by varying the magnetic resistance of the path of the load-dependent flux by means of an adjustable air gap.

Figure 2:
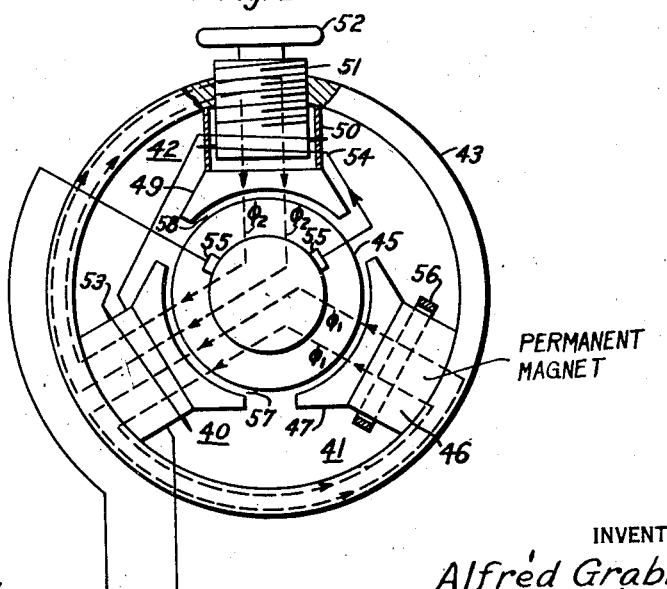

For a further understanding of the nature and scope of my invention, reference may be had to the following detailed description, taken in connection with the following drawing, in which Figure 1 is a combined sectional view and schematic diagram of a dynamo-electric machine embodying my invention;

Fig. 2 is a combined sectional view and schematic diagram of another embodiment of my invention.

Referring more particularly to Fig. 1, the reference number 10 denotes generally a form of dynamo-electric machine comprising a frame 11 of any well known form of construction having field poles 12 and 13 positioned within, and an armature 15 rotatably positioned between the field poles 12 and 13, and separated from them by an air gap 16. Brushes 18 may be positioned on the commutator 19 of the armature.

In order to secure the desired operating characteristics, the field pole 12 may comprise two similar sections, each comprising, respectively, shoe members 20 and 21, which are preferably of a material of low reluctance and having low residual magnetism, and permanent magnet body members 22 and 23. The shoe portions 20 and 21 may be separated from each other by an air gap 25 in which an adjustable core 26 is positioned. The core 26 may comprise a shoe portion 27, a body portion 28 having adjusting threads 29 disposed upon it, and a hand wheel portion 30, or the like, for adjusting the position of the shoe portion 27 with respect to the shoe portions 20 and 21 of the field pole 12.

A series field winding 32 may be disposed about the two shoe portions 20 and 21 and connected in series circuit relation with the brushes 18, the commutating coil 33, work 34, the arc 35, and the welding electrode 36, for providing a load dependent control flux which will react with the flux from the permanent magnet members 22 and 23.

The pole member 13 may be constructed in any well known manner, preferably of a material having a low residual magnetism, to provide a low reluctance path for the flux from the permanent magnet members 22 and 23, from the armature 15 to the frame 11.

Under no load conditions, the flux from the permanent magnet members 22 and 23, which may be referred to as the permanent magnet excitation flux, and represented by the dotted lines Ø1, crosses the air gap 16 from the shoe members 20 and 21 (the air gap 25 being larger in comparison), traverses the armature 15, crosses the air gap 16 into the pole member 13 and returns by way of the frame 11. Under load conditions, the series field coil 32 produces a load dependent flux which may be represented by the dotted lines Ø2. The normal path of this flux is from the shoe portions 20 and 21 across the air gap 25 to the shoe member 27 of the core 26, through the body portion 28 to the frame 11 and back to the shoes through the permanent magnet members 22 and 23.

As the load increases, the flux Ø2 also increases, increasing the reluctance of the permanent magnet members 22 and 23 and the shoe portions 20 and 21, as well as tending to distort the path of the permanent magnet flux Ø1. This increased reluctance reduces the excitation flux Ø1 and thus reduces the voltage induced in the armature, thereby limiting the load current. Since the magnetomotive force of the field winding 32 is directed away from the armature, it may be seen that none of the flux Ø2 will tend to cross the gaps 16, and the excitation flux Ø1 will not be merely replaced by the flux Ø2, but it is actually reduced and crowded to the outer edges of the pole member 12, further reducing its effectiveness. By adjusting the position of the core 26, the air gap 25 can be altered and the initial path of the flux Ø1 may be varied, thus altering the static characteristics of the machine.

Short circuiting damper windings 37 and 38 which may comprise a number of turns of insulated conductor, or the like, are disposed about the permanent magnet members 22 and 23, respectively, to minimize the effects of sudden load surges upon the residual magnetism of the members.

To improve commutation under fluctuating loads a commutating pole member 39 may be positioned within the frame between the poles 12 and 13, having a coil 33 about it in series circuit relation with the load device to induce in it a polarity opposite to that of the adjacent permanent magnet member.

In Fig. 2, another embodiment of my invention is shown, utilizing three pole members 40, 41 and 42, mounted in any suitable manner within a frame 43 and having an armature 45 rotatably positioned between them. The armature 45 may be similar to that disclosed in my Austrian Patent 138,684, embodying windings lagging by 120 degrees as described therein.

In this embodiment of the invention, the field pole 40 may be of any well known form of construction, while the pole 41 comprises a permanent magnet body member 46 with a shoe member 47 preferably of a material having a high permeability and low residual magnetism. The field pole 42 may comprise a shoe member 49 suitably secured to a hollow body member 50 having an adjustable iron core 51 positioned within it. The magnetic resistance of the pole 42 may be varied by varying the position of the core member 51 by means of the handwheel 52, or some other suitable method of adjustment.

In this instance the effectiveness of the permanent magnet pole flux, or load independent flux, may be controlled by series field windings 53 and 54 disposed oppositely about the pole members 40 and 42 and connected in series circuit relation with the brushes 55 of the armature 45. A short circuiting damper winding 56, which may comprise a number of turns of insulated conductor or the like, is disposed about the body 46 of the permanent magnet pole 41 to minimize the effect of varying load conditions on the residual magnetism of the pole member.

Under no-load conditions, the load independent excitation flux ∅1 from the permanent magnet pole 41 is disposed to divide equally between the pole members 40 and 42 if their air gaps 57 and 58 are equal. A difference of air gaps will cause a greater flow of flux to the pole having the lesser air gap.

Under load conditions, the series field windings 53 and 54 set up a flux ∅2 which distorts the path of the flux ∅1, diverting it from the air gap 58, reducing its effectiveness and hence reducing the induced voltage in the armature 45.

From the foregoing description, it may be seen that the flux ∅2 in no way tends to destroy the residual magnetism of the permanent magnet pole members, but rather tends to strengthen it as it acts in the same sense or direction through the permanent magnet members, and that as the load on the machine increases, the armature voltage is reduced and the short circuit current limited. Hence it may be seen that I have with my invention provided a dynamo-electric machine of a new and useful construction, which, without the use of external reactors or separate excitation provides characteristics desirable for use in welding. In addition, the absence of extra moving parts, coils and iron reduces the losses, increases the efficiency and simplifies the construction.

Since certain further changes may be made in the foregoing construction and different embodiments of the invention may be made without departing from the scope thereof, it is intended that all the matter set forth in the foregoing disclosure and set forth in the accompanying drawing shall be considered illustrative and not in a limiting sense.

I claim as my invention:

1. A dynamo-electric machine comprising in combination, a frame, a pair of field pole pieces of opposite polarity disposed therein, an armature with a pair of brushes, permanent magnet means in conjunction with the body portion of a field pole piece for providing an excitation flux, series coil means about the tip portion of a pole piece to provide an additive load-dependent magnetic control flux in the permanent magnet means for decreasing the excitation flux with increasing armature current, and adjustable means to vary the reluctance of the path of the load-dependent flux and thereby control the effectiveness of the excitation flux.

2. In a dynamo-electric machine, in combination, a frame having a sectioned field pole piece disposed therein, a permanent magnet body member in cooperation with said pole piece to provide an excitation flux, a series field winding common to sections of said pole piece disposed to provide a load dependent flux through the permanent magnet member for controlling the excitation flux, and a damper winding on the body portion of at least one pole piece to couple the load-dependent flux and the permanent magnet member flux.

3. In a dynamo-electric machine, in combination, a frame, an armature having a pair of brushes, at least a pair of field pole members disposed within the frame, a series field winding disposed on a tip portion of field pole member in series circuit relation with the brushes to produce a series field control flux, adjustable means in conjunction with a field pole member and the frame to provide a variable leakage path for the series field magnetic flux, and permanent magnet means to provide an excitation flux controlled by the series flux, said series flux having the same polarity as the permanent magnet flux and effective to reduce the linkage of the excitation flux with the armature.

4. In a dynamo-electric machine, in combination, a frame, an armature having a pair of brushes, at least a pair of field pole members one of which is disposed in part to comprise permanent magnet body members adapted to provide a non-load dependent excitation magnetomotive force, a common series field winding in conjunction with the tip portions of said pole member and disposed in series field relation with the brushes to provide a load-dependent control flux, adjustable means to vary the series field control flux, and short-circuiting damper windings disposed in relation with the permanent magnet members to limit the effect of the load-dependent flux on the permanent magnet members.

5. In a dynamo-electric machine, in combination, a frame, an armature having a pair of brushes, a pair of field pole members one of which comprises two sections, a permanent magnet body member in conjunction with a section of a field pole member adapted to provide an excitation magnetomotive force independent of the load, a common series field winding disposed about the tip portions of the sectioned pole member in series circuit relation with the brushes to provide a load-dependent magnetic flux, and means cooperative with the two sections of the sectioned pole member to vary the magnetic resistance of the path of the load dependent flux without decreasing the non-load-dependent magnetomotive force.

6. In a dynamo-electric machine, in combination, a frame, a plurality of field pole members mounted therein, an armature having a pair of brushes, permanent magnet means disposed to form the body portion of one of said pole members and to provide an excitation flux, series field means disposed about a soft iron portion of one of said pole members in series relation with the brushes to produce a load-dependent control flux adapted to vary the saturation of an excitation flux path and reduce the excitation effects of the excitation flux without reducing the residual amount of such flux, and means associated with said frame disposed to adjust the magnetic resistance of the path of the load dependent control flux and alter the static characteristics of the machine.

7. In a dynamo-electric machine, in combination, a frame, an armature having a pair of brushes, a plurality of pole members disposed within said frame, a permanent magnet pole member disposed to provide an excitation flux, series field means disposed about a soft iron pole member in series circuit relation with the brushes to provide a saturating control flux for decreasing the machine potential under load without decreasing the residual amount of the excitation flux, and adjustable magnetic shunt means associated with a soft iron pole member to vary the reluctance of the path of the load-dependent control flux.

8. In a dynamo-electric machine, in combination, a frame, an armature having a pair of brushes, a plurality of pole members, a series field winding disposed about a soft iron portion of at least one pole member in series circuit relation with the brushes to provide a series control flux, a permanent magnet body member in association with a pole member to provide a source of excitation flux, a damper winding associated with said permanent magnet body member disposed to resist any tendency of load variations to demagnetize the permanent magnet pole, and adjustable magnetic means in the series control flux path to vary the output voltage of the machine by altering the path of the excitation flux through varying the amount of series control flux.

9. In a dynamo-electric machine, in combination, a frame, an armature having a pair of brushes, a permanent magnet pole member disposed to provide excitation flux, series field means associated with a soft iron pole member connected in series circuit relation with the brushes to produce a load dependent magnetic flux and secure a drooping terminal voltage characteristic by diversion of the permanent magnet excitation flux from its no-load path without decreasing the residual amount thereof, and adjustable magnetic means within a pole member disposed to alter the no-load characteristics of the machine by changing the reluctance of the path of the series field flux.

10. In a dynamo-electric machine, in combination, a frame, an armature having a pair of brushes, a pair of pole members one of which comprises two pole sections separated by a high reluctance path, permanent magnet means associated with the last mentioned pole member to provide a non-load-dependent source of excitation magnetomotive force, a common series field winding about the sections of said pole member in series circuit relation with the brushes to provide a load-dependent source of flux disposed to reduce the terminal voltage under load by changing the effective path of the permanent magnet flux, and means for varying the reluctance of the high-reluctance flux path of said pole member to alter the characteristics of the machine.

11. In a dynamo-electric machine, in combination, a frame, an armature having a pair of brushes, a plurality of field pole members one of which comprises a permanent magnet body member adapted to provide an excitation flux for the armature, series field means about a soft iron portion of at least one field pole member disposed in series circuit relation with the brushes to provide a load-dependent control flux adapted to displace said load independent excitation flux, and adjustable means in the path of the series field flux to alter the characteristics of the machine by varying the effectiveness of the flux produced by the permanent magnet member without reducing the residual magnetism thereof.

12. In a dynamo-electric machine, in combination, a frame, an armature having a pair of brushes, permament magnet means to provide an excitation magnetomotive force independent of the load, series field means about a soft iron portion of a pole member disposed in series circuit relation with the brushes to provide a load-dependent control flux which functions to decrease the terminal voltage of the machine under load by increasing the saturation of, and distorting the excitation flux path without reducing the residual amount of such flux, and adjustable means in the magnetic path of the load-dependent flux to alter the static characteristics of the machine by varying the magnetic resistance of the said path.

13. In a dynamo-electric machine, in combination, a frame, an armature having a pair of brushes, permanent magnet means to provide a load-independent magnetomotive force for supplying an excitation flux for the armature, series field means disposed to provide a load-dependent control flux functioning to reduce the terminal voltage of the machine by displacing the excitation flux without reducing the residual amount of said flux, means for controlling the load-dependent flux, and a single commutating pole adjacent to a permanent magnet means of opposite polarity so that the commutating pole does not tend to demagnetize the said permanent magnet means.

14. In a dynamo-electric machine, in combination, a frame, an armature having a pair of brushes, a permanent magnet pole member disposed to provide a load-independent magnetomotive force for supplying a source of armature excitation flux, a pair of soft iron pole members provided with series field means disposed in series circuit relation with the brushes for the control of the excitation flux to reduce the terminal voltage of the machine under load without reducing the amount of excitation magnetomotive force, aforesaid pole members being equally spaced within said frame, means to alter the static characteristics of the machine by varying the reluctance of the series flux path, and a commutating pole member adjacent to a load-independent source of excitation flux of opposite polarity to improve commutation.

15. A dynamo-electric machine comprising, a frame, an armature rotatably disposed within the frame, a plurality of field pole pieces positioned within the frame, means including a permanent magnet member associated with one of said pole pieces for providing an excitation flux for the armature, and means including a series field winding disposed upon a shoe portion of said pole piece for providing an additive flux through the permanent magnet member to reduce the linkage of the excitation flux with the armature.

16. In a dynamo electric machine, in combination, a frame, an armature, a plurality of pole pieces positioned within the frame, one of said pole pieces comprising a sectioned permanent magnet body member adapted to provide an excitation magnetomotive force and a plurality of shoe portions of low retentivity, a series field winding disposed about the shoe portions of said pole piece to provide an additive flux in the permament magnet members for reducing the excitation flux of the permanent magnet members, and magnetic shunt means for providing a variable reluctance path for the series field flux varying the output of the machine.

ALFRED GRABNER.